No. 719,732. PATENTED FEB. 3, 1903.
J. H. BRAITHWAITE.
VARIABLE SPEED GEARING.
APPLICATION FILED SEPT. 29, 1902.
NO MODEL. 3 SHEETS—SHEET 2.

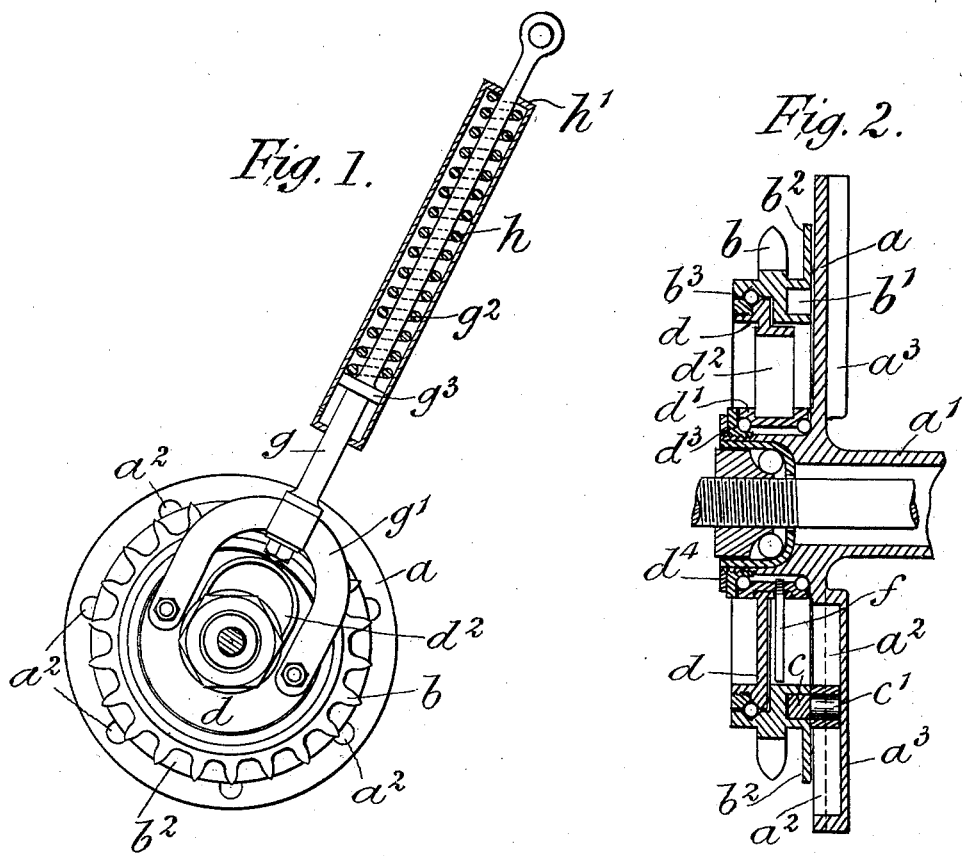

Witnesses:
R. H. Young
W. B. Catching

Inventor:
James H. Braithwaite
by Herbert W. T. Jenner
Attorney.

THE NORRIS PETERS CO., PHOTO-LITHO., WASHINGTON, D. C.

No. 719,732. PATENTED FEB. 3, 1903.
J. H. BRAITHWAITE.
VARIABLE SPEED GEARING.
APPLICATION FILED SEPT. 29, 1902.
NO MODEL. 3 SHEETS—SHEET 3.
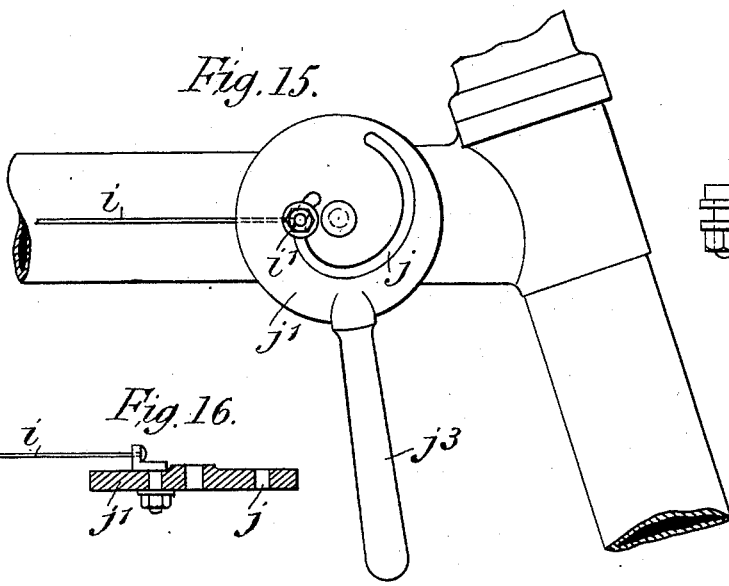
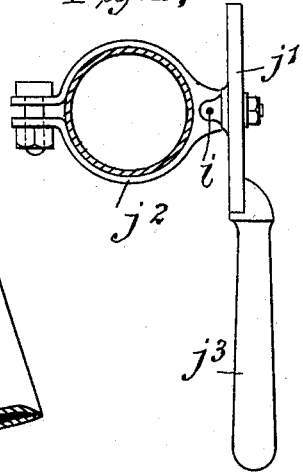
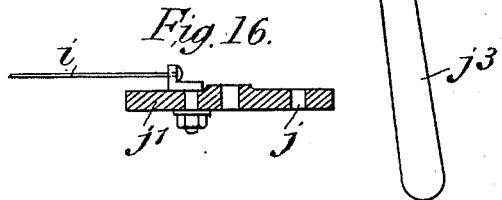
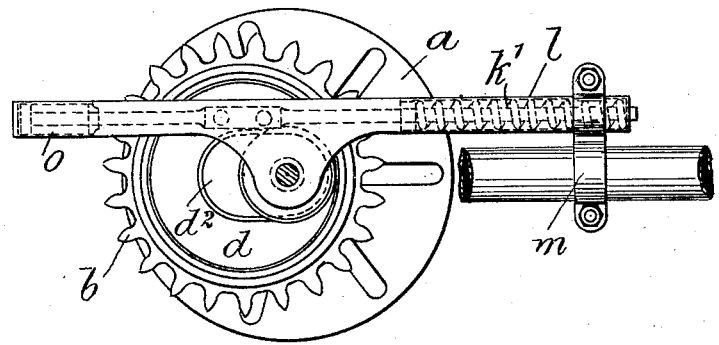
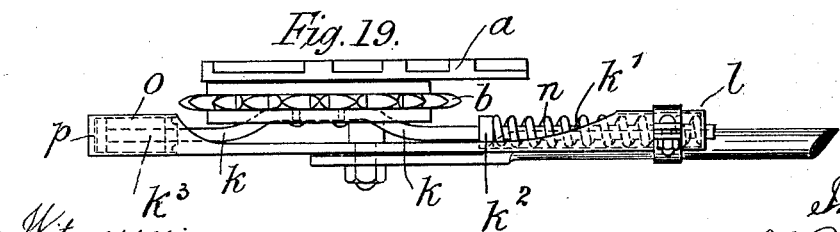

UNITED STATES PATENT OFFICE.

JAMES HOLDEN BRAITHWAITE, OF BARNSLEY, ENGLAND.

VARIABLE-SPEED GEARING.

SPECIFICATION forming part of Letters Patent No. 719,732, dated February 3, 1903.

Application filed September 29, 1902. Serial No. 125,286. (No model.)

*To all whom it may concern:*

Be it known that I, JAMES HOLDEN BRAITHWAITE, a subject of the King of Great Britain and Ireland, residing at St. Mary's Villa, Gawber road, Barnsley, in the county of York, England, have invented new and useful Improvements in Variable-Speed Gearing, of which the following is a specification.

This invention relates to a new or improved variable-speed gear for use in connection with velocipedes, motor-vehicles, and the like and for other purposes for which it is suitable, the object being to provide simple and reliable variable-speed gearing of such a nature as to allow of practically any number of changes or different gears being obtained between the highest and the lowest; and the invention consists, essentially, in a driving member connected by clutch-blocks or the like with a driven member, with the driving member capable of being disposed against the driven member more or less eccentrically thereto, so that the drive is applied at a point nearer to or farther from the center of the driven member, and the practical result is that while the diameter of the driving member is unaltered the raising or lowering of the same against the driven member, thereby altering the degree of eccentricity, has the practical effect of driving onto a larger or smaller wheel.

In order that this invention may be fully understood, it will now be described with reference to the accompanying drawings, which illustrate the invention in some of its forms applicable to velocipedes, and in which—

Figure 7:
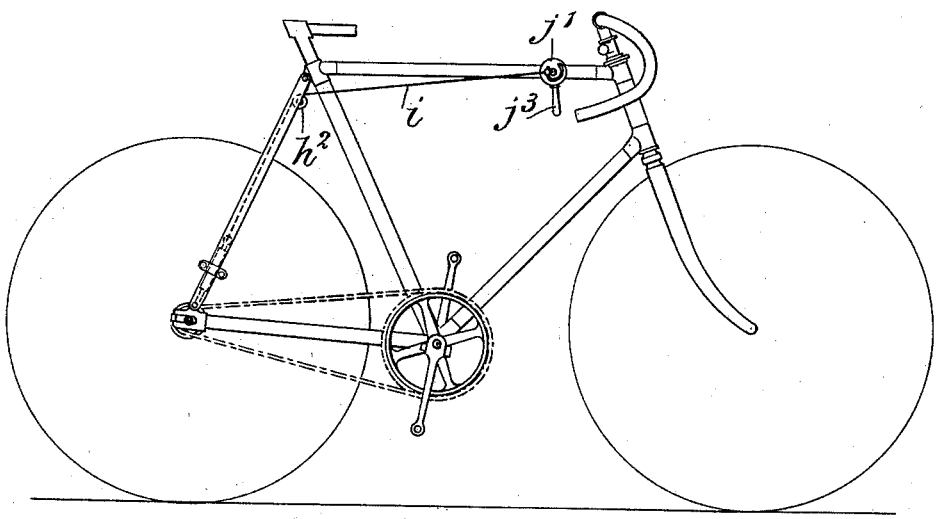
Figure 8:
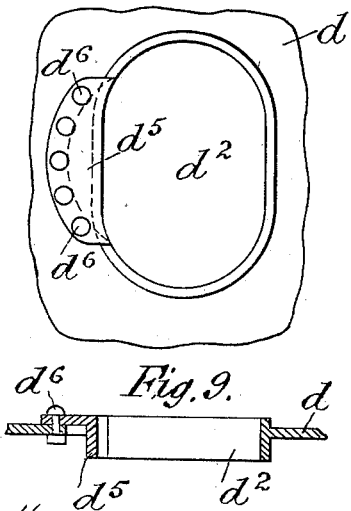
Figure 10:
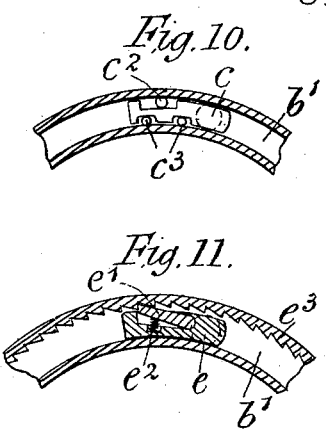

Figure 1 is a front elevation of the variable-speed gear-wheel according to this invention, with part of the mechanism for varying the gear shown in section. Fig. 2 is a cross-section of the gear-wheel drawn to an enlarged scale as compared with Fig. 1. Fig. 3 is a diagrammatic front elevation of the driving and driven members, the driving member being shown in section and with the driving member raised to its highest point—that is to say, concentric with the driven member—representing the lowest gear. Fig. 4 is a cross-section of Fig. 3. Fig. 5 is a similar view to Fig. 3, but with the driving member at its lowest point or the greatest degree of eccentricity representing the highest gear. Fig. 6 is a cross-section of Fig. 5. Fig. 7 is a diagrammatic view of a bicycle, showing the invention applied thereto. Figs. 8 and 9 are details hereinafter referred to. Fig. 10 is a detailed view of one of the clutch-blocks of the friction type. Figs. 11 to 14 are detail views of clutch-blocks of the ratchet type. Figs. 15 to 17 are detail views of the mechanism employed for altering the position of the driving member; and Figs. 18 to 20 show, in side elevation, plan, and detail, an alternative arrangement whereby the variation in gear is rendered automatic.

This improved variable-speed gear consists of a plate $a$, secured to or formed integrally with the hub $a'$ and furnished with a number of radial guides or grooves $a^2$, the latter being preferably formed in lugs $a^3$, cast or formed on the back of the plate $a$, and a toothed ring $b$, having on one side an annular groove or channel $b'$, containing as many clutch-blocks $c$, either of the roller or ratchet type, as there are guides in the plate $a$, while each clutch-block engages one of the radial guides $a^2$ by means of a laterally-projecting pin or stud $c'$, preferably furnished with a friction-roller. Around the outer edge of the annular groove or channel $b'$ a strengthening-flange $b^2$ is formed, while in the inner periphery of the chain-ring $b$ and toward the front of the same a ball-race $b^3$ is formed, by means of which the chain-ring $b$ is supported upon the edge of a disk $d$, and this disk is carried by a broad ring $d'$, mounted upon the hub $a'$, and is formed with a wide flanged opening $d^2$, which allows it to slide up and down on the ring $d'$, the latter being secured in position by the bearing-cone $d^3$ and locking-ring $d^4$. When the toothed or chain-ring $b$ is concentric with the plate $a$, each clutch $c$ will be in engagement with the chain-ring and the plate $a$ will be driven at the same rate of speed as the chain-ring; but on lowering the chain-ring $b$ to the position shown at Fig. 5 or to any intermediate position only the clutch which for the time is nearest the center of the plate $a$ will be in engagement with the chain-ring and driving the plate $a$. All the others will be free and overrunning the chain-ring until the plate $a$, in revolving, brings them each in turn into the position nearest to its own center, when they will each in turn take up the drive and again run free, overrunning the chain-ring as soon as another clutch-block is nearer the center.

Figure 12:
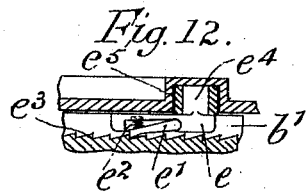
Figure 13:
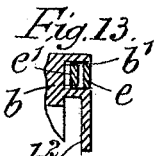
Figure 14:
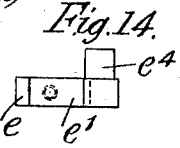

Friction-blocks of the type shown at Fig. 10 may be employed, wherein $c^2$ represents the clutch-roller and $c^3$ antifriction-rollers, or clutch-blocks of the ratchet type may be employed, as shown in Figs. 11 to 14. In this arrangement each of the blocks $e$ is furnished with a pawl $e'$, normally pressed forward into the operative position by a spring $e^2$ and designed to engage ratchet-teeth $e^3$, formed in the side or the bottom of the annular groove or channel $b'$, as shown in Figs. 11 and 12, respectively, and each clutch-block is provided with a laterally-projecting pin or stud $e^4$, preferably carrying a friction-roller $e^5$, engaging one of the slots in the plate $a$.

In order that the disk $d$ may be passed over the ring $d'$ to be secured thereon, a part of the slide $d^5$ of the opening $d^3$ is cut away and secured in position by screws $d^6$, as shown at Figs. 8 and 9, and in order to prevent the ring $d'$ from turning a pin $f$, Fig. 2, is secured to the ring $d'$ and passes through a perforation in the flange of the opening $d^2$.

In order that the chain-ring or driving member $b$ may be conveniently raised or lowered for altering the gear, the forked extremity $g'$, Fig. 1, of a rod $g$ is secured to the disk $d$, its upper extremity projecting into a casing $g^2$, designed to be secured to one of the members of the frame of the machine, and a spiral spring $h$, bearing against the collar or shoulder $g^3$ and the top $h'$ of the casing $g^2$, tends to force the rod $g$, and with it the disk $d$ and chain-ring $b$, down to its lowest position, although in Fig. 1 it is shown in the raised position. In order that the rod $g$ may be raised as required, one extremity of a suitable flexible connection $i$ is secured to the top of the said rod and passes over a pulley $h^2$, mounted on the frame, Fig. 7, and its free extremity is then secured to a pin or stud $i'$, passing through a cam-like slot $j$, formed in a plate $j'$, secured by a clamp $j^2$ to the frame of the machine in a convenient position, so that the plate $j'$ may be turned by means of the handle $j^3$ to the required position for drawing up the flexible connection $i$, Figs. 7 and 15 to 17.

In order that the variation in gear may be rendered automatic according to the work to be done and as shown in Figs. 18 to 20, the disk $d$ and chain-ring $b$ are arranged to slide horizontally against the plate $a$, and a curved rod $k$ is secured to the disk $d$, one arm of which, $k'$, enters a casing $l$, secured by a clamp $m$ to one of the side stays of the frame, and a spring $n$, arranged between the top of the casing $l$ and a nut $k^2$, screwing on the rod $k$, normally presses the rod back, and with it the disk $d$ and chain-ring $b$, to the position of the highest gear. The tension of the spring $k'$ is regulated by the nut $k^2$, so that in ordinary free pedaling the highest gear is employed; but when a greater amount of work has to be done, as in ascending an incline, the pressure on the pedals transmitted through the chain overcomes the resistance of the spring $n$, and the chain-ring $b$ is brought nearer toward the center of the disk $d$, thereby lowering the gear proportionately to the pressure applied. Any slack in the chain due to the varying positions of the chain-ring may be taken up by a suitably-arranged jockey-pulley, while in order that jerky and uneven action of the sliding parts may be prevented, due to sudden variation in the pressure applied to the pedals, the arm $k^3$ of the rod $k$ may project into a closed chamber $o$, formed at the opposite extremity of the casing $l$, while the extremity of the arm $k^3$ would be furnished with a disk $p$, closely fitting the chamber $o$ and furnished with a clack-valve and a small hole or perforation, while the casing $o$ would be filled with oil or other suitable fluid, so that the rod $k$ could be drawn forward freely, but only return slowly, as the small hole would be the only passage for the oil when the valve had closed. In all cases when the chain-ring is turned in a reverse direction to that in which it is revolved for driving it engages none of the clutch-blocks and provides a perfect free wheel.

Having now described my invention, what I claim as new, and desire to secure by Letters Patent, is—

1. In a variable-speed gear, the combination, with a revoluble driven member provided with diverging guides, of a revoluble driving member slidable across the face of the said driven member and provided with an annular groove, clutch-blocks working in the said groove and provided with projections which engage with the said guides, and means for sliding the said driving member, substantially as set forth.

2. In a variable-speed gear, the combination, with a revoluble driven member and a revoluble driving member arranged side by side, one of the said members being slidable across the face of the other, one of the said members being provided with diverging guides and the other said member being provided with an annular groove; of clutch-blocks working in the said groove and provided with projections which engage with the said guides, and means for sliding the said slidable member, substantially as set forth.

3. In a variable-speed gear, the combination, with a wheel-hub provided with a plate having radial guides, of a revoluble driving-ring slidable across the face of the said plate and provided with an annular groove, clutch-blocks working in the said groove and provided with projections which engage with the said guides, a bearing for the said ring to revolve on, and means for sliding the said ring and its bearing, substantially as set forth.

4. In a variable-speed gear, the combination, with a wheel-hub provided with a plate having radial guides, of a ring journaled on the said hub, a disk mounted on the said ring and provided with an opening which permits it to slide across the face of the said plate, a driving member journaled on the said disk and provided with an annular groove, clutch-blocks working in the said groove and provided with projections which engage with the said guides, and means for sliding the said disk and driving member, substantially as set forth.

5. In a variable-speed gear, the combination, with a wheel-hub provided with a plate having radial guides, of a ring journaled on the said hub, a disk mounted on the said ring and provided with an opening which permits it to slide across the face of the said plate, a driving member journaled on the said disk and provided with an annular groove, clutch-blocks working in the said groove and provided with projections which engage with the said guides, an operating-rod connected to the said disk, and a spring which engages with the said rod and normally holds the said disk and driving member in a prearranged position, substantially as set forth.

6. In a variable-speed gear, the combination, with a wheel-hub provided with a plate having radial guides, of a ring journaled on the said hub, a disk mounted on the said ring and provided with an opening which permits it to slide across the face of the said plate, a driving member journaled on the said disk and provided with an annular groove, clutch-blocks working in the said groove and provided with projections which engage with the said guides, an operating-rod connected to the said disk, a spring which engages with the said rod and normally holds the said disk and driving member in a prearranged position, a flexible connection attached to the said rod, and a pivoted cam for operating the said connection and holding the parts in various positions, substantially as set forth.

In testimony whereof I affix my signature in presence of two witnesses.

JAMES HOLDEN BRAITHWAITE.

Witnesses:
THOMAS GARNER,
WILLIAM LAUGHTON.